(No Model.) 2 Sheets—Sheet 1.
A. M. BUTZ.
THERMO ELECTRIC DAMPER REGULATOR AND ALARM.
No. 347,866. Patented Aug. 24, 1886.
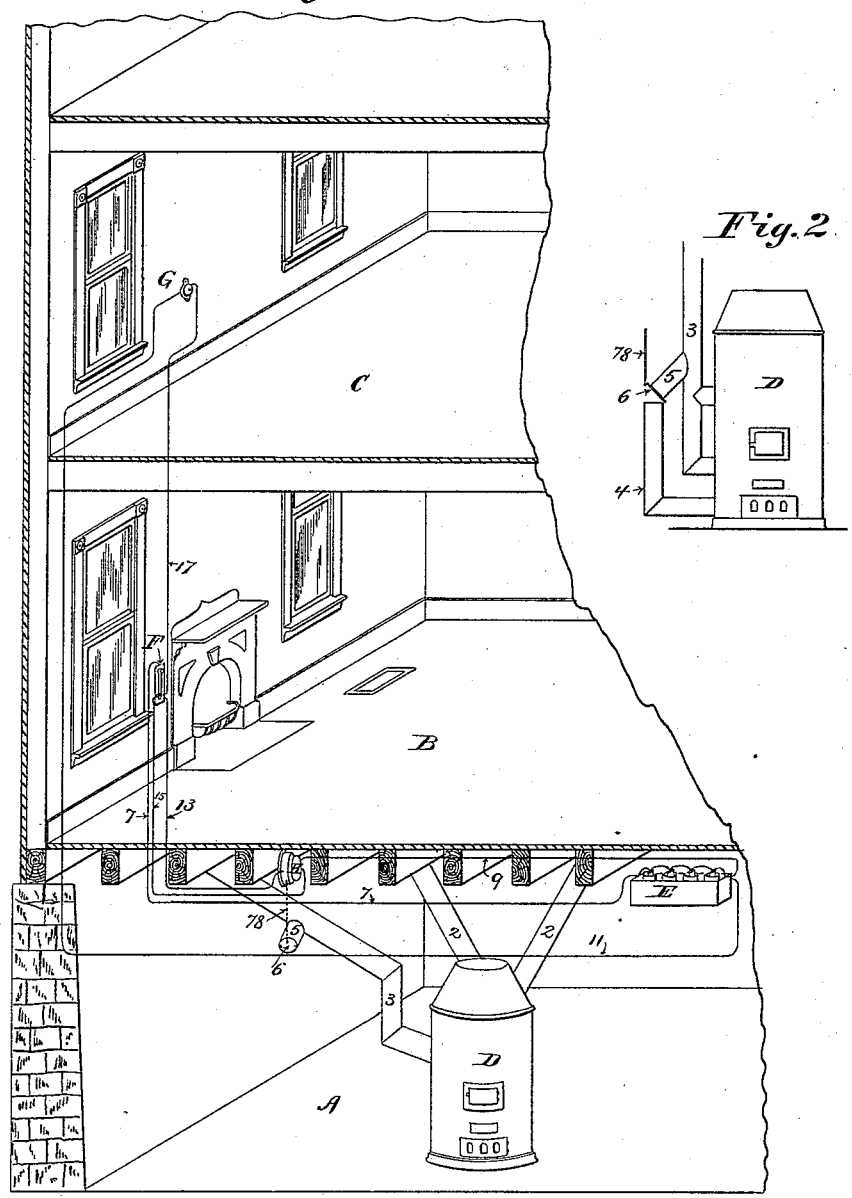

(No Model.) 2 Sheets—Sheet 2.

A. M. BUTZ.
THERMO ELECTRIC DAMPER REGULATOR AND ALARM.

No. 347,866. Patented Aug. 24, 1886.

Witnesses
J. Llewitt
R. H. Sanford

Inventor
Albert M. Butz
By A. C. Paul
Att.

UNITED STATES PATENT OFFICE.

ALBERT M. BUTZ, OF MINNEAPOLIS, MINNESOTA.

THERMO-ELECTRIC DAMPER REGULATOR AND ALARM.

SPECIFICATION forming part of Letters Patent No. 347,866, dated August 24, 1886.

Application filed March 22, 1886. Serial No. 196,046. (No model.)

*To all whom it may concern:*

Be it known that I, ALBERT M. BUTZ, of Minneapolis, in the county of Hennepin and State of Minnesota, have invented certain Improvements in Thermo-Electric Damper Regulators and Alarms, of which the following is a specification.

My invention relates particularly to improvements in damper regulators and alarms that are designed to operate the dampers or valves of a furnace or stove as the temperature rises or falls in the room or rooms where the temperature is to be regulated, and also to sound an alarm when the temperature of such rooms has become so reduced as to indicate that a fresh supply of fuel is needed in the stove or furnace.

The damper-regulator may be used independently of the alarm, and may be used to operate ventilating or other temperature regulating valves.

My present invention consists, generally, in a thermostat located in two open electric circuits, one of which is closed by the thermostat when the temperature at the thermostat rises to a certain point, and the other is closed when the temperature falls to a certain point, and a spring-motor arranged in said circuits and adapted to operate a regulating-valve.

My invention also consists in the construction and combination hereinafter described, and particularly pointed out in the claims.

Figure 3:
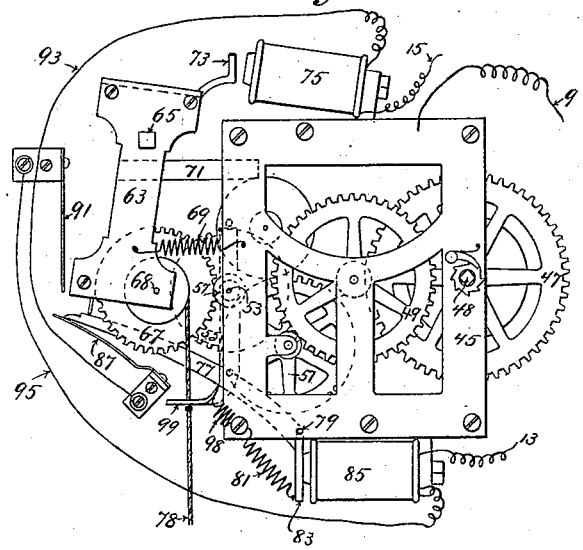
Figure 4:
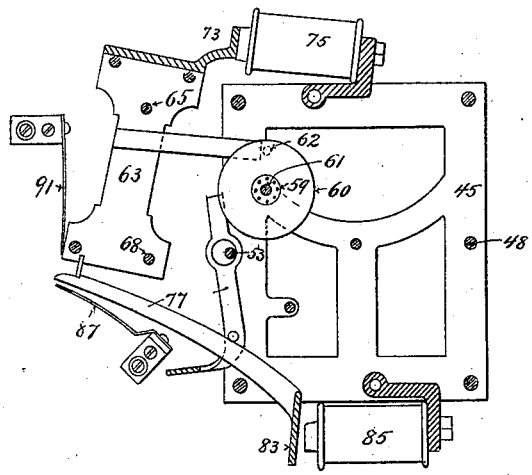
Figure 7:
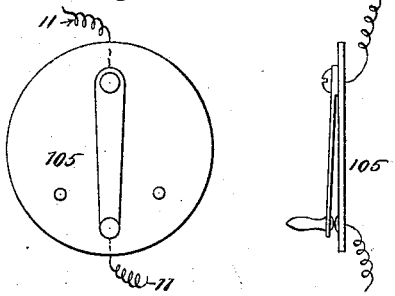
Figure 8:
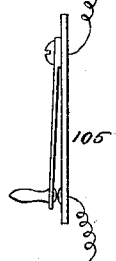
Figure 6:
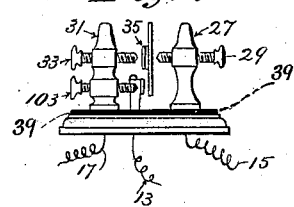
Figure 5:
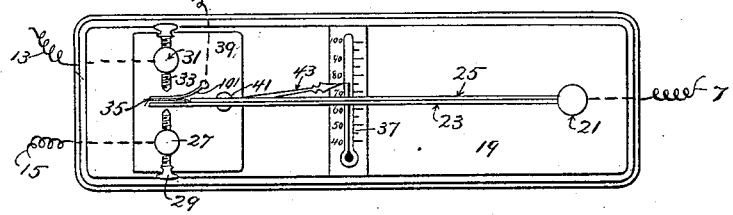

In the accompanying drawings, forming part of this specification, Figure 1 is a sectional elevation of a part of a house, showing my devices arranged therein. Fig. 2 is a detail of a modification. Fig. 3 is a sectional elevation of the spring-motor, the casing being omitted. Fig. 4 is a similar view of the motor with a portion of the mechanism omitted. Fig. 5 is a plan of the thermostat. Fig. 6 is an end elevation of the thermostat; Figs. 7 and 8, views of a switch used with the alarm-circuit.

A in the drawings represents the furnace-room of a house, in which is located a furnace, D, which has a smoke-pipe, 3, and suitable hot-air pipes, 2 2.

B represents a room whose temperature it is desired to regulate.

C represents a room in which an alarm is located to indicate when the furnace needs attention. This alarm will usually be located in a servant's room or kitchen, or it may be in a stable or separate building.

In the furnace smoke-pipe 3 is located a short pipe, 5, having a suitable check-valve, 6. This valve is preferably opened by gravity, the end of the pipe being preferably oblique, as shown.

H represents a spring-motor that controls the valve 6.

E represents a suitable battery, that may be located in the furnace-room or at any convenient point.

F represents a thermostat located in the room B, and G an alarm located in the room C. A wire, 7, extends from one end of the thermostat directly to the battery E. A wire, 9, extends from the opposite pole of the battery to the motor; a wire, 11, extends from the same pole of the battery to the alarm; wires 13 and 15 extend from opposite sides of the thermostat to the motor; and a wire, 17, extends from one side of the thermostat to the alarm.

When the temperature of the room where the thermostat is located rises above the desired point, the thermostat-bar is moved against one of the contact-screws, and one of the currents through the motor is closed, and the motor is thereby operated to release the check-valve, which then opens by gravity. When the temperature falls below the minimum point desired, the thermostat-bar is moved against the other contact-screw, the other circuit is closed, and the motor is thereby operated to close the valve.

The motor is so constructed that when one circuit is closed the mechanism of the motor is set in motion to close the valve, and this circuit at the motor is opened and the other is closed. When the second circuit is closed at the thermostat, it causes the motor to release the valve and open the second circuit and close the first. With this arrangement the circuits are closed only for an instant at a time, and the battery will therefore operate for a long time without any attention.

The thermostat that I prefer to employ is shown in detail in Figs. 5 and 6. This thermostat consists of a suitable base-plate, 19, of wood or other suitable material, having a metallic post, 21, mounted on one end, to which the wire 7 is connected. A compound bar consisting of a metal strip, 23, and a rubber or gutta-percha strip, 25, (or consisting of two bars of metal of unequal expansion,) is mounted in the post 21 and extends over the base-plate.

27 is a post, to which the wire 15 is connected. It is provided with a contact screw or pin, 29, whose end comes opposite the metal strip 23. The wire 13 is connected to a similar post, 31, upon the opposite side of the plate. This post has a contact screw or pin, 33. These screws may be set so that when the temperature of the room in which the thermostat is placed rises to a predetermined point the expansion of the rubber will cause the metal strip to come in contact with the screw 29, and when it falls the spring-strip 35, that is secured to the strip 23, as shown in Figs. 5 and 6, will come in contact with the screw 33. When the metal strip comes in contact with the screw 29, one circuit of the motor will be closed, and the motor will be operated to release the valve and to break this circuit. When the strip is in contact with the screw 33, the other circuit through the motor will be closed, the motor will start the damper, and will break this circuit.

The thermostat may, if preferred, be provided with a thermometer and scale, and the posts may be mounted on a movable plate, so that the screws may be readily set to the desired temperature. I have shown the thermostat thus constructed in Figs. 5 and 6.

37 represents a thermometer that is mounted on the plate 19. The posts 27 and 31 are mounted on a rubber or other insulating-plate, 39, that is pivoted to the plate 19 by pivots 41. A pointer, 43, is secured to the plate 39, and is adapted to move over the thermometer-scale. As the plate is moved in one direction the end of the pointer is moved in the opposite direction on the scale. The plate may be moved until the end of the pointer is opposite the degree on the scale at which it is desired to close the circuit.

The valve 6 is arranged to open by gravity as soon as it is released by the motor.

A valve that would be opened by a suitable spring or weight might be used as an equivalent for the gravity-valve.

The motor that I prefer to use with the thermostat and valve is shown in detail in Figs. 3 and 4, the casing being omitted. In these figures 45 represents a suitable frame, in which the gearing is mounted. 48 represents a spring-operated shaft having a ratchet and pawl, and adapted to be wound up in the usual manner. This shaft has a gear, 47, and through suitable gears, 49 and 51, drives a shaft, 53, having a pinion, 57, and a gear, 55. The gear 55 meshes with a pinion, 59, on a shaft, 61. The shaft 61 is provided with a stop-wheel, 60, having a lug or pin, 62. A suitable frame or lever, 63, is mounted upon a pivot, 65, and carries a shaft, 68, with a gear, 67, that is adapted to mesh with the pinion 57. A suitable stop-arm, 71, is secured to the frame 63, and when the gear 67 is out of mesh with the pinion this arm is in position to be encountered by the pin 62 on the wheel 60, which stops the train. The frame 63 is provided with a suitable armature, 73. An electro-magnet, 75, which may be of any ordinary form, is arranged in position to operate the armature 73. A lever, 77, is pivoted at 79 to the frame, and its end is adapted to engage the pivoted frame 63 and hold the gear 67 out of mesh with the pinion 57. A spring, 81, tends to hold this lever against the pivoted frame. The lever 77 carries an armature, 83, and an electro-magnet, 85, is arranged in position to move this armature. A contact-spring, 87, is arranged in position to be in contact with the lever 77 when the armature 83 is against the magnet 85. A contact-spring, 91, is arranged in position to be in contact with the pivoted frame 63 when the armature 73 is in contact with the electro-magnet 75. A wire, 93, connects the magnet 75 with the contact-spring 87, and a wire, 95, connects the magnet 85 with the contact-spring 91. The wire 15 from the thermostat is connected with the magnet 75, and the wire 13 with the magnet 85. The wire 9 from the battery is connected with a suitable part of the motor mechanism. As an equivalent for this arrangement, this pole of the battery and the motor may be connected with suitable ground-wires. The damper 6 is connected with a cord, 78, (see Fig. 1,) that is secured to the shaft 68, and adapted to be wound thereon. I also prefer to provide the motor with a pivoted stop, 99, that is thrown into engagement with the lug on the wheel 60 by a knot or projection on the valve-cord, and stops the mechanism as soon as the valve is closed.

The operation of the device is as follows: The parts of the motor being in the position shown in Fig. 3, the valve will be closed. As soon as the temperature of the room rises above the desired point the strip 23 of the thermostat comes in contact with the screw 29, and the circuit is closed through the wire 15. The current passes from the battery through the wire 7 to the thermostat, thence through wire 15 to the electro-magnet 75, thence through wire 93 and contact-spring 87 to the motor mechanism, thence through the return or ground wire to the battery. The magnet 75 draws its armature 73 into the position shown in Fig. 4, carrying the gear 67 out of mesh with the pinion 57, permitting the lever 77 to engage the pivoted frame 63, and to move out of contact with the contact-spring 87, and thereby break the circuit. At the same time the pivoted frame 63 comes in contact with the contact-spring 91. The weight of the damper causes it to open as soon as the gear 67 is out of mesh with the pinion 57. A spring, 98, moves the stop 99 away from the wheel 60. The parts are now in substantially the position shown in Fig. 4, and remain so, the valve being open, until the temperature of the room lowers enough to bring the thermostat-bar in contact with the screw 33, when the circuit is closed through the wire 13, the course of the current being through the wire 7 to the thermostat, thence through the wire 13 to the magnet 85, thence through the wire 95 to the contact-spring 91, thence through the pivoted frame 63 and the frame of the motor to the wire 9, and to the battery through this wire. The closing of this circuit causes the magnet 85 to draw the armature 83 back to the position shown in Fig. 3, which carries the lever away from the pivoted frame 63, moves the stop-arm from the stop on the wheel 60, and allows the spring 69 to throw the gear 67 into mesh with the pinion 57. At the same time the current is broken by the moving of the pivoted frame out of contact with the contact-spring 91, and the contact-spring 87 in the other circuit is closed, ready for that circuit to be again closed at the thermostat. The motor mechanism being released runs and winds the cord 78 on the shaft 68. When the valve is closed, the knot on the cord moves the pivoted stop 99, and causes it to encounter the pin 62 on the wheel 60, thereby stopping the mechanism.

The operations are repeated as often as the variations in temperature close the circuits at the thermostat.

I also prefer to provide in connection with the device an alarm that will be sounded as often as the temperature falls to such a point as to indicate that the furnace needs a fresh supply of fuel, or in some way needs attention.

The alarm is to be located at any desired point, and is connected to the thermostat by the wire 17, and to the battery or ground by the wire 11. The wire 17 is connected to a plate, 101, secured upon the plate 19, and provided with an adjusting-screw, 103, having a point of insulating material. As the temperature of the room falls the spring 35 on the thermostat encounters the screw 33 and closes the valve, as already explained. If the temperature continues to fall, the spring 35 yields until the strip 23 encounters the plate 101, when the circuit through the alarm is closed and the alarm is sounded.

A suitable switch, 105, Figs. 7 and 8, is preferably arranged in the alarm-circuit, by means of which that circuit may be broken by the attendant after his attention has been called to the condition of the furnace.

In some instances I prefer to provide the furnace with a draft-pipe, to supply air below the grate, that is also controlled by this valve-regulating mechanism, and in Fig. 2 I have shown a preferable arrangement for this purpose. In this figure, 4 represents a suitable pipe arranged to supply air to the furnace below its grate. The upper end of this pipe is open and arranged under the check-valve 6, so that when that valve drops to open the end of pipe 5 it will close the pipe 4, and when the valve closes the pipe 5 it opens the pipe 4. With this arrangement, when the fire is to be checked, the regulating-valve 6 opens the pipe 5 and closes pipe 4. The air is then cut off from the furnace and admitted to the smoke-pipe above the furnace. When the fire is to be allowed to burn more freely, the valve closes the pipe 5 and opens the pipe 4, thus admitting air below the grate of the furnace and cutting it off from the smoke-pipe.

The number and arrangement of the gears forming the motor, and the construction and arrangement of the check-valve, may be varied without departing from my invention.

The device may be applied to any kind of furnace or stove, and may be connected to other kinds of valves than that shown. The thermostat may be arranged in any preferred manner in the room to be regulated.

The device may also be used in connection with ventilating or other temperature-regulating valves.

I claim as my invention—

1. The combination, with a regulating-valve, of two open electric circuits, a thermostat located in and adapted to close each of said circuits, a valve-operating motor located in both of said circuits, an electro-magnet in one circuit adapted to set the motor mechanism in motion, and an electro-magnet in the other circuit adapted to release the winding-shaft of the motor and allow the valve to open, substantially as described.

2. The combination, with a stove or furnace, D, provided with a regulating-valve, of the thermostat F, the battery E, a valve-operating motor, H, the circuit-wires 9, 13, 15, and 7, the electro-magnet 75, connected with the wire 15, and the magnet 85, connected with the wire 13, substantially as described.

3. The combination, with the regulating-valve, of the thermostat, the battery, electro-magnets 75 and 85, and connecting-wires, the train of gears, the pivoted frame carrying the armature 73, the pivoted stop-lever 77, the contact-springs 87 and 91, the shaft 68, provided with the gear 67, and means connecting said shaft with the valve, all substantially as described.

4. The combination, in a valve-operating motor, of a train of gears, a pivoted frame, 63, carrying the shaft 68, and gear 67, adapted to mesh with a pinion, 57, in the train of gears, an armature, 73, on said pivoted frame, an electro-magnet, 75, a pivoted lever, 77, adapted to engage the frame 68 and hold the gear 67 out of mesh, an armature, 83, carried by said lever, an electro-magnet, 85, and springs 69 and 81, substantially as set forth.

5. The combination, in a valve-operating motor, of the train of gears, the stop-wheel 60, having a lug, 62, the pivoted frame 63, carrying the shaft 68, and gear 67, the valve-cord 78, having a stop thereon, and the pivoted lever 99, arranged to be moved by said cord into engagement with said stop-wheel, for the purpose set forth.

6. The combination, in the valve-operating motor, with the train of gears, of the pivoted frame 63, carrying the shaft 68, and gear 67, the stop-wheel 60, the magnets 75 and 85, stop-lever 77, armatures 73 and 83, and a stop adapted to engage the wheel 60 as the gear 67 is thrown out of mesh with the pinion 57, for the purpose set forth.

7. The combination, with the valve, battery, and motor having the magnets 75 and 85, of the thermostat having the compound bar 23 25, the screws 29 and 33, and the circuit-wires 7, 15, and 17, all substantially as and for the purpose set forth.

8. The combination, with the regulating-valve, of the valve-motor, the battery, the alarm, the connecting-wires, and the thermostat having the post 21, connected with the wire 7, the compound bar 23 25, mounted in said post, the spring 35 on said bar, the screws 29 33, connected with the wires 15 13, and the plate 101, connected with the wire 17, for the purpose set forth.

9. In a draft-regulator, in combination with a battery, valve-motor, and circuit-wires, the thermostat having the compound bar, the pivoted plate carrying the contact point or points, the thermometer 37, and the pointer 43, secured to said plate, all substantially as and for the purpose set forth.

10. The combination, in a thermostat, with the compound bar having the spring 35, of the contact-screws 33 29, the plate 101, and the adjusting-screw 103 for said plate, as set forth.

In testimony whereof I have hereunto set my hand this 13th day of March, 1886.

ALBERT M. BUTZ.

In presence of—
A. C. PAUL,
R. H. SANFORD.